United States Patent
Du et al.

(10) Patent No.: US 9,996,336 B2
(45) Date of Patent: *Jun. 12, 2018

(54) APPARATUS AND METHOD FOR VALIDATING APPLICATION DEPLOYMENT TOPOLOGY IN CLOUD COMPUTING ENVIRONMENT

(71) Applicant: International Business Machines Corporation, Armonk, NY (US)

(72) Inventors: Geng Du, Beijing (CN); Chong Feng, Beijing (CN); Wei Feng Li, Beijing (CN); Xin Li, Beijing (CN); Qi Liu, Beijing (CN); Qiang Wang, Tianjin (CN); Yue Wang, Beijing (CN); Chunxiao Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 151 days.

This patent is subject to a terminal disclaimer.

(21) Appl. No.: 15/210,035

(22) Filed: Jul. 14, 2016

(65) Prior Publication Data

US 2016/0321062 A1   Nov. 3, 2016

Related U.S. Application Data

(63) Continuation of application No. 14/669,067, filed on Mar. 26, 2015, now Pat. No. 9,448,832.

(30) Foreign Application Priority Data

Apr. 22, 2014 (CN) .......................... 2014 1 0161440

(51) Int. Cl.
*G06F 9/455* (2018.01)
*G06F 9/445* (2018.01)
(Continued)

(52) U.S. Cl.
CPC ............ *G06F 8/65* (2013.01); *G06F 9/45558* (2013.01); *G06F 9/50* (2013.01); *H04L 67/10* (2013.01);
(Continued)

(58) Field of Classification Search
CPC .................................................. G06F 9/45558
See application file for complete search history.

(56) References Cited

U.S. PATENT DOCUMENTS 9,448,832 B2   9/2016  Du et al.
2005/0192781 A1*  9/2005  Deltch ................ G06F 11/3442
                                                703/2
(Continued)

FOREIGN PATENT DOCUMENTS

CN  102281290 A   12/2011
CN  103716403 A    4/2014
(Continued)

OTHER PUBLICATIONS

Ying, "The Design and Implementation of Database Subsystem of the PaaS Cloud Computing System's Simulation Platform," Beijing University of Posts and Telecommunications Thesis, 2011, 62 Pages, Abstract Only.
(Continued)

*Primary Examiner* — Charlie Sun
(74) *Attorney, Agent, or Firm* — Robert C. Bunker

(57) ABSTRACT

The present invention relates to an apparatus and a method for validating application deployment topology in a cloud environment. There is provided an apparatus for validating application deployment topology in a cloud environment comprising: a topology skeleton generator configured to generate, based on multiple VMs and script packages running on the VMs created by a user and required to deploy an application as well as running order of script packages and (Continued)

data dependency between script packages set by the user, a topology skeleton that comprises at least scripts of script packages of respective VMs and running order of the script packages; and a simulator configured to simulate a runtime environment in the cloud environment at the apparatus, thereby validating the running order and data dependency with respect to the topology skeleton, wherein the simulator is installed in the apparatus by using a simulator installation package retrieved from the cloud environment.

16 Claims, 11 Drawing Sheets

(51) Int. Cl.
    *H04L 29/08*     (2006.01)
    *G06F 9/50*     (2006.01)

(52) U.S. Cl.
    CPC ............... *G06F 2009/4557* (2013.01); *G06F 2009/45591* (2013.01); *G06F 2009/45595* (2013.01)

(56) References Cited

U.S. PATENT DOCUMENTS

| | | |
|---|---|---|
| 2010/0031247 A1 | 2/2010 | Arnold et al. |
| 2010/0325619 A1 | 12/2010 | Song et al. |
| 2013/0138718 A1 | 5/2013 | Mallur et al. |
| 2013/0151975 A1 | 6/2013 | Shadi et al. |
| 2013/0232498 A1 | 9/2013 | Mangtani et al. |
| 2013/0262643 A1* | 10/2013 | Anderson ................. G06F 8/60 709/223 |
| 2013/0268638 A1 | 10/2013 | Anderson et al. |
| 2013/0290853 A1 | 10/2013 | Kimmet |
| 2014/0033197 A1 | 1/2014 | Vinberg et al. |
| 2014/0156557 A1* | 6/2014 | Zeng ................. G06Q 10/0631 705/348 |
| 2014/0164598 A1 | 6/2014 | Srinivasan |
| 2014/0297713 A1 | 10/2014 | Meigen et al. |
| 2015/0301849 A1 | 10/2015 | Du et al. |

FOREIGN PATENT DOCUMENTS

| | | |
|---|---|---|
| CN | 105100127 A | 11/2015 |
| JP | 2013239867 A | 11/2013 |
| WO | 2012025773 A1 | 3/2012 |

OTHER PUBLICATIONS

Antonescu et al., "Dynamic Topology Orchestration for Distributed Cloud-Based Applications," Second Symposium on Network Cloud Computing and Applications (NCCA), Dec. 3-4 2012, 8 Pages.

Baldwin, "Similarities and Differences between Java and C++," Java Programming, Last Updated Oct. 3, 1999, p. 1-5, Lecture Notes #8, http://www.dickbaldwin.com/java/Java008.htm, Accessed on Nov. 19, 2015.

Buyya et al., "Modeling and Simulation of Scalable Cloud Computing Environments and the CloudSim Toolkit: Challenges and Opportunities," International Conference on High Performance Computing and Simulation, Jun. 21-24, 2009, p. 1-11.

Mell et al., "The NIST Definition of Cloud Computing," National Institute of Standards and Technology, Sep. 2011, p. 1-3, Special Publication 800-145.

IBM, "List of IBM Patents or Patent Applications Treated as Related (Appendix P)," Oct. 4, 2016, p. 1-2.

* cited by examiner

```
def import():
    # get initial parameters from environment
    IHS_IP = sys.parameters['IHS_IP']

def implement():
    # add implementation content here
    # install Web Server
    ......

DMGR_IP = sys.getip()
    DMGR_PORT = '80'
    DMGR_USERNAME = 'admin'
    DMGR_PASSWORD = 'password' def export():
    # export parameters
    sys.export['DMGR_IP']
    sys.export['DMGR_PORT']
    sys.export['DMGR_USERNAME']
    sys.export['DMGR_PASSWORD']
```

FIG. 8

APPARATUS AND METHOD FOR VALIDATING APPLICATION DEPLOYMENT TOPOLOGY IN CLOUD COMPUTING ENVIRONMENT

BACKGROUND

The present invention generally relates to the field of computer, and more specifically, to an apparatus and a method for validating application deployment topology in cloud computing environment.

PaaS is the abbreviation for Platform-as-a-Service, and it is a business model in which a server platform is provided as a service. A service providing a software program through network is called SaaS (Software as a Service), whereas in the cloud computing era, providing a corresponding server platform or developing environment as a service is PaaS. The service provided by PaaS differs from other services in that PaaS provides a basic platform instead of a certain application. In traditional concept, a platform is the basis of providing services to the outside. In general, as the basis of application system deployment, a platform is built and maintained by an application service provider. However, PaaS subverts this concept. A special platform service provider builds and operates the basic platform, and provides the platform to an application system operator as a service.

A developer (a PaaS' user) may deploy complicated topology to install middleware, applications, cloud services, etc. The developer utilizes, for example, an integrated developing environment to create a topology model which corresponds to a kind of deployment of an application in a hardware server. FIG. 4 shows an example of correspondence between a deployment topology model and hardware servers. Three Virtual Machines (VMs) are shown in the upper part of FIG. 4, wherein VM Custom Node is deployed on two servers in actual deployment in the lower part of FIG. 4.

In general, it is necessary to run script packages on respective VMs to complete deployment. FIG. 5 shows a view of an example of running script packages on three VMs to deploy applications. In FIG. 5, in the VM Dmgr (Deployment Manager), script packages "1. Install Application Server Binaries", "2. Create Web Server" and "4. Add Member to Cluster" are to be executed; in the VM Custom Node, script packages "1. Install Application Server Binaries" and "3. Add Custom Node to Dmgr" are to be executed; and in the VM HTTP server, a script package "1. Install HTTP Server Binaries" is to be executed. In FIG. 5, for example, execution of the script package 2 in the VM Dmgr needs the output parameter IHS_IP of the script package 1 in the VM HTTP server as its input parameter, execution of the script package 3 in the VM Custom Node needs four output parameters (DMGR_IP, DMGR_PORT, DMGR_USERNAME, DMGR_PASSWORD) of the script package 2 in the VM Dmgr as its input parameters, and the script package 4 in the VM Dmgr needs to be executed after the script package 3 in the VM Custom Node. Therefore, these script packages need to be executed in a specific order. In FIG. 5, dashed line arrows are used to show the execution order of script packages across VMs, and bubbles that branch from dashed line arrows are used to show data dependency between script packages.

A user sets up said order and data dependency during design period. However, at present, said order and data dependency can only be validated at runtime, e.g., after various VMs are launched. That is, at present, validation of said order and data dependency needs to be performed in actual deployment. However, it takes a long time to validate the order and data dependency of script packages of VMs at runtime. For example, deployment of BPM (Business Process Management) Pattern needs to take about 1 hour and 20 minutes, and it has complicated execution order and data dependency. When being deployed, some script packages may not export necessary data, so other script packages that depend on these script packages will run to error. The user needs to find out the reason for the failure from a large volume of log files and multiple VMs, which is very time-consuming and fussy work. Further, in a case where the error has been found, it is necessary to perform time-consuming deployment again after correcting the error (e.g., modifying the script package). Also, in this process, other errors may occur. In brief, at present, application deployment performed by the PaaS' user is very time-consuming.

SUMMARY

In order to solve the above problems, one of objects of the present invention is to provide an apparatus and a method capable of validating application deployment topology in a cloud computing environment before being deployed in the cloud computing environment.

According to one aspect of the present invention, there is provided an apparatus for validating application deployment topology in a cloud computing environment, comprising: a topology skeleton generator configured to generate, based on multiple VMs and script packages running on the VMs created by a user and required to deploy an application of the user, as well as running order of said script packages and data dependency between said script packages set by the user, a topology skeleton that comprises at least scripts of script packages of respective VMs and running order of the script packages; and a simulator configured to simulate a runtime environment in the cloud computing environment at the apparatus, thereby validating said running order and data dependency with respect to said topology skeleton, wherein said simulator is installed in said apparatus by using a simulator installation package retrieved from the cloud computing environment.

According to another aspect of the present invention, there is provided a method for validating application deployment topology in a cloud computing environment at an apparatus, comprising: based on multiple VMs and script packages running on the VMs created by a user and required to deploy an application of the user, as well as running order of said script packages and data dependency between said script packages set by the user, generating a topology skeleton that comprises at least scripts of script packages of respective VMs and running order of the script packages; and configuring a simulator to simulate a runtime environment in the cloud computing environment at said apparatus, thereby validating said running order and data dependency with respect to said topology skeleton, wherein said simulator is installed in said apparatus by using a simulator installation package retrieved from the cloud computing environment.

With the apparatus and the method for validating deployment topology in the cloud according to the present invention, it is possible to provide, at the client side relative to the cloud server platform, the PaaS' user with a light-weight appliance to help the user quickly and easily validate execution order and data dependency at runtime. In addition, the apparatus and the method according to the present invention can offload the deployment validation workload from the cloud platform side to the client side, thereby improving the performance of the cloud platform. In addition, the apparatus and the method according to the present invention can save a great deal of time that is taken to dig out the failure reason during deployment from large volumes of logs on the cloud platform and lots of virtual machines at runtime.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 8 shows exemplary content of script files under a script package folder "2_Create_Web_Server" in the VM Dmgr;

DETAILED DESCRIPTION

Figure 1:
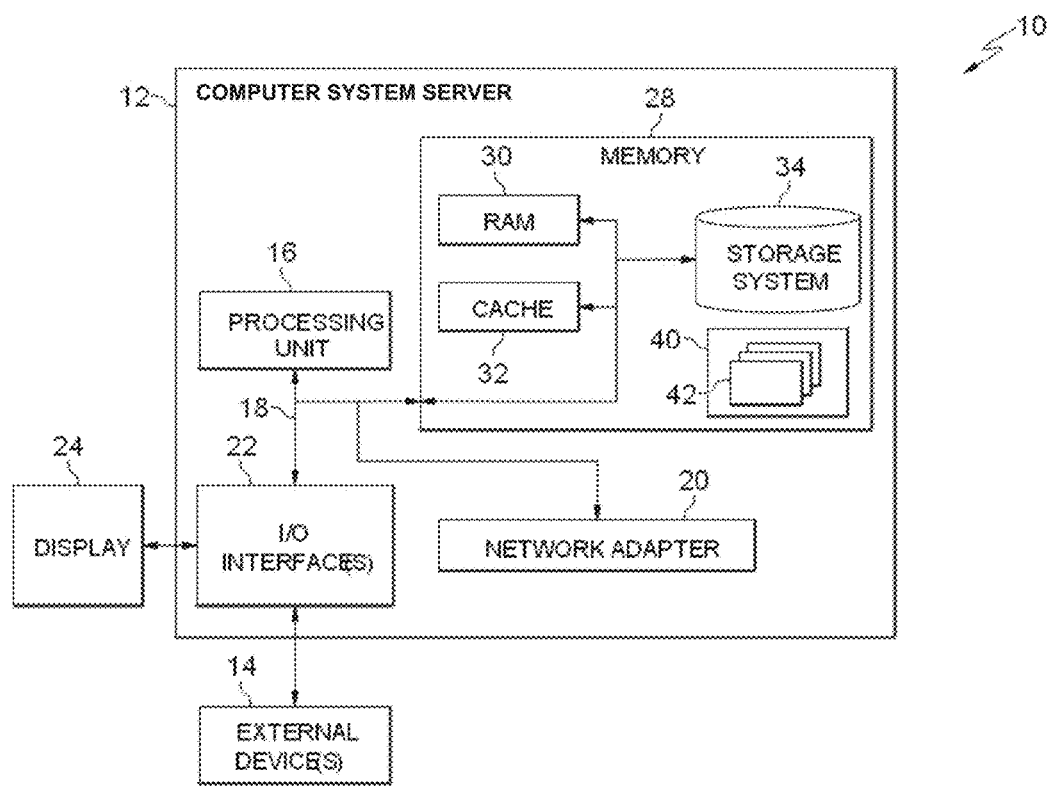
FIG. 1 shows a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
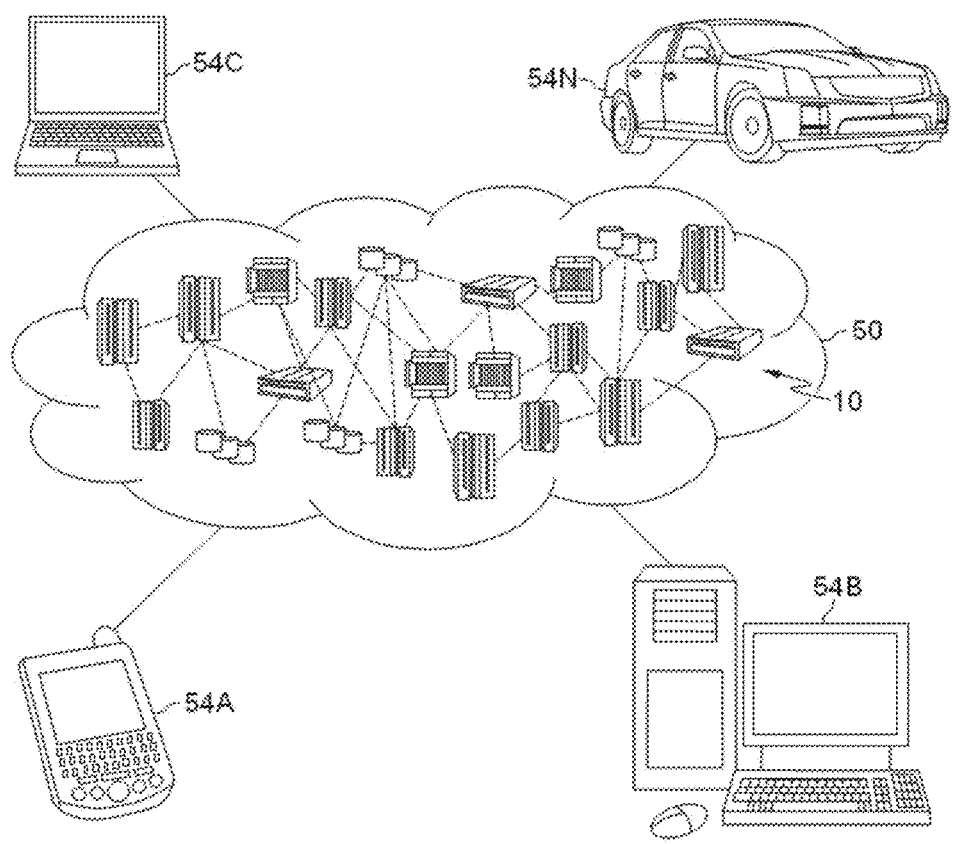
FIG. 2 shows a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
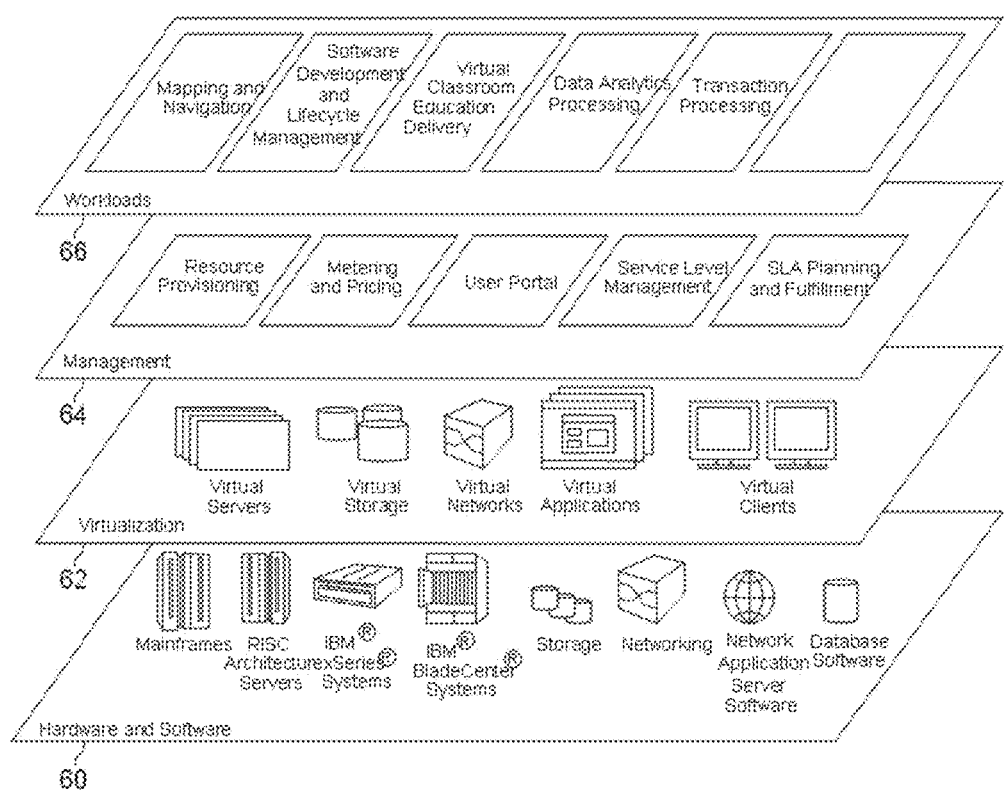
FIG. 3 shows abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and moving desktop.

The present invention relates to the virtualization layer 62.

Figure 6:
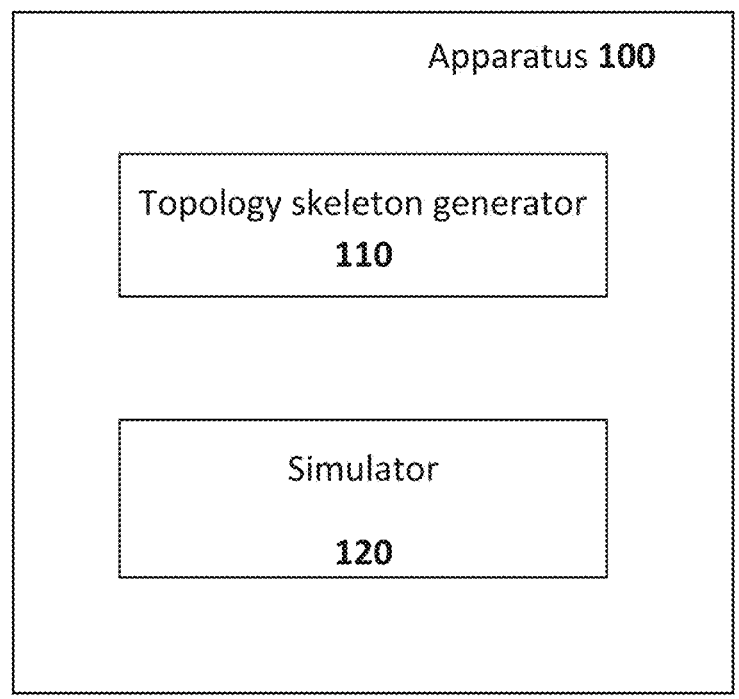
FIG. 6 is a schematic view showing an apparatus for validating application deployment topology in a cloud computing environment according to an embodiment of the present invention.

FIG. 6 is a schematic view showing an apparatus 100 for validating application deployment topology in a cloud computing environment according to an embodiment of the present invention. The apparatus 100 may be any computing apparatus that can run VMs. In one embodiment, the apparatus 100 may be a client relative to a cloud server platform (a cloud computing environment). In FIG. 6, the apparatus 100 includes a topology skeleton generator 110 and a simulator 120. The topology skeleton generator 110 is configured to generate, based on multiple VMs and script packages running on the VMs created by the user and required to deploy the user's application as well as running order of said script packages and data dependency between said script packages set by the user, a topology skeleton that includes at least scripts of script packages of respective VMs and running order of the script packages. The simulator 120 is configured to simulate a runtime environment in the cloud computing environment at the apparatus 100, thereby validating said running ordering and data dependency with respect to said topology skeleton. Said simulator is installed in the apparatus 100 by using a simulator installation package retrieved from the cloud computing environment.

Figure 4:
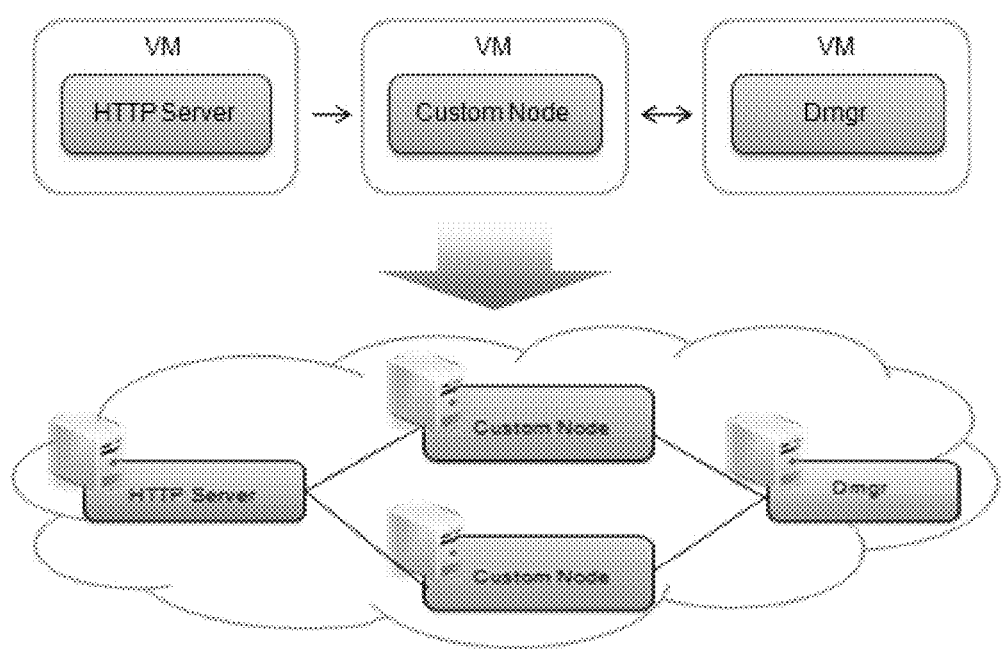
FIG. 4 shows an example of a correspondence between a deployment topology model and hardware servers.
Figure 5:
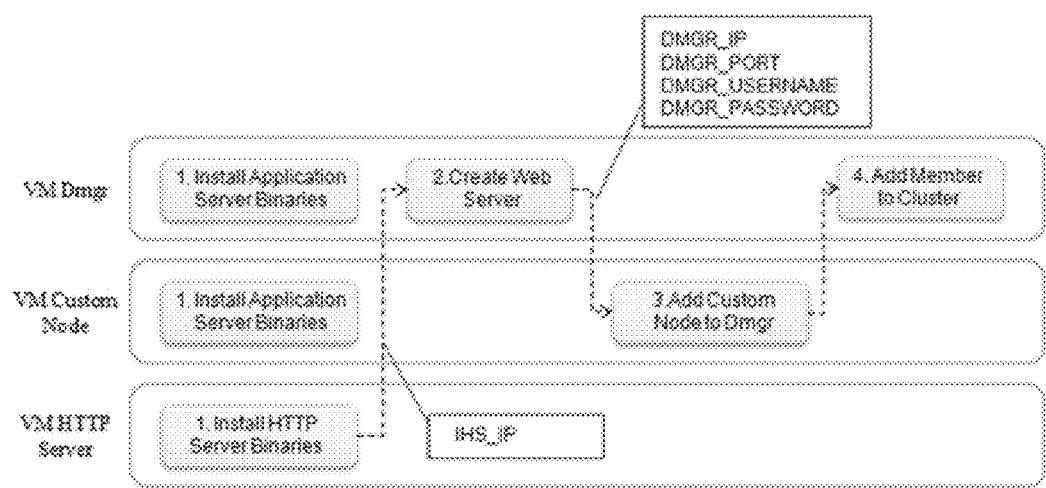
FIG. 5 is a view showing an example of graphic representation of a topology design for deploying applications.

In one embodiment of the present invention, the user may create VMs and script packages by using GUI (Graphical User Interface) of a topology designer in the integrated developing environment of the apparatus 100 (with operations, e.g., drag-and-drop, connect, etc.), and may define running order of script packages and data dependency between script packages. For example, the user first creates multiple VMs required to deploy the user's application. For example, as shown in the upper part of FIG. 4, the user creates three VMs in the graphic form in this example. In another embodiment, for example, VMs and script packages created by the user may be in a data structure such as a table, etc. Then, the user creates script packages running on respective VMs in the topology designer, and defines running order of script packages and data dependency between script packages. FIG. 5 is an example of the topology design obtained by using the topology designer. The topology design includes graphic representation (as shown by the round-cornered rectangles in FIG. 5) of multiple VMs and script packages running on the VMs created by the user. The topology design also includes running order (as shown by the dashed lines in FIG. 5) of script packages and data dependency (as shown by the rectangular bubble in FIG. 5) between script packages set by the user.

The topology designer that provides the graphic interface simplifies the difficulty of user's design. For example, products such as the Pivotal One of the Pivotal company and the Cloud Foundry of the VMware company, etc, provide the topology designer which has functions described above.

The topology skeleton generator 110 generates, based on said topology design, a topology skeleton that includes at least scripts in script packages of respective VMs and running order of the script packages. In one embodiment of the present invention, the topology skeleton may be in the form of tree folder. It includes VMs and script packages. Specifically, each VM corresponds to a VM folder under the root folder, each script package running on the VM corresponds to a subfolder under the VM folder, and each subfolder contains a script.

Figure 7:
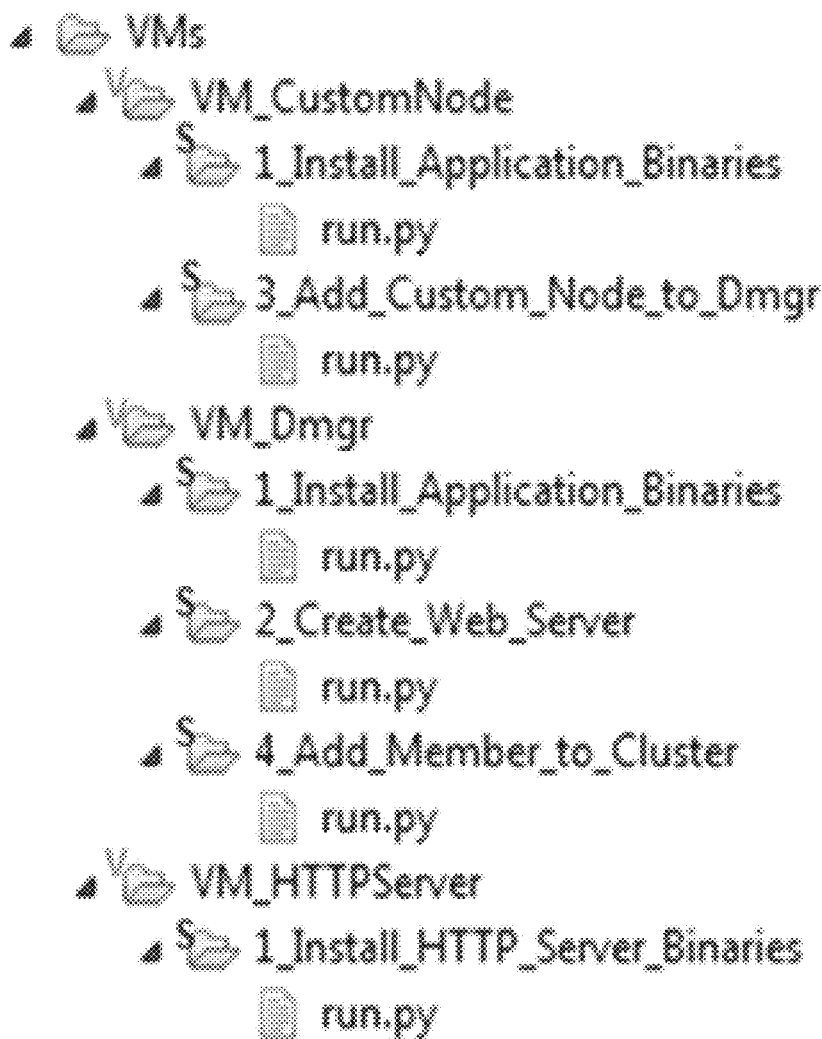
FIG. 7 shows an example of a topology skeleton in the form of tree folder generated by a topology skeleton generator.

For example, FIG. 7 shows an example of a topology skeleton in the form of tree folder generated by the topology skeleton generator 110. The topology skeleton in FIG. 7 is generated by the topology skeleton generator 110 based on the topology design in FIG. 5. Specifically, the root folder "VMs" includes three VM folders (the icon of which has a label "V"), whose names are VM_CustomNode, VM Dmgr and VM_HTTPServer. These three VM folders correspond to the VM Custom Node, the VM Dmgr and the VM HTTP Server in FIG. 5, respectively. The VM folder includes subfolders (the icon of which has a label "S") corresponding to respective script packages running on the VM. For example, in FIG. 7, the VM folder VM_CustomNode includes two subfolders, i.e., 1_Install_ Application_Binaries and 3_Add_Custom_Node_to_Dmgr, which correspond to the two corresponding script packages in the VM Custom Node in FIG. 5, respectively. In addition, each subfolder corresponding to a script package contains a script file. Serial numbers contained in the names of subfolders described above represent execution order of script packages of respective VMs. In FIG. 7, said script file is, for example, run.py. The name of the script is merely exemplary, and any other names may be adopted in other embodiments.

FIG. 8 shows exemplary content of the script "run.py" under the script package folder "2_Create_Web_Server" in the VM Dmgr. The script includes an import method for getting input parameters from the outside and an export method for exporting parameters to the outside. The script may also include an implement method for implementing the function of the script specifically. In the example of the script "run.py" shown in FIG. 8, the import method import( ) is used to get input parameters (such as initial parameters) from the outside (i.e., the environment); the implement method implement( ) is used to implement the function of the script specifically, such as installing middleware binaries, etc; and the export method export( ) is used to export parameters to the outside to be used by other scripts.

In one embodiment, said script is a default script (i.e., a script automatically generated by the apparatus 100), and the apparatus 100 may also include an editor. The editor may be used by the user to edit at least a part of said default script. For example, the user my use the editor to edit the implement( ) method in the script in FIG. 8 to add content to be implemented, such as codes for installing middleware binaries, etc. In FIG. 8, the function of the implement( ) method is to install a Web server. This portion of codes may be added by the user through the editor and are omitted in FIG. 8. In the implement( ) method in FIG. 8, codes for assigning values to four parameters to be exported are included.

In the above example given, the names of the import method, the implement method and the export method are not limited to import( ) implement( ) and export( ) Other names may also be adopted, as long as they can be identified and can function in the same way.

In the above example, the topology skeleton is described in the form of tree folder. In another embodiment, the topology skeleton may be in other forms, such as XML file or graphic representation, etc.

After the topology skeleton is generated by the topology skeleton generator 110, the simulator 120 simulates the runtime environment in the cloud computing environment at apparatus 100, thereby validating said running order and data dependency with respect to said topology skeleton.

The simulator 120 is installed in the apparatus 100 by using a simulator installation package retrieved from the cloud computing environment. In one embodiment according to the present invention, the simulator installation package is updated at the cloud side in response to changes in the cloud environment. Therefore, the simulator installation package downloaded from the cloud side (the cloud platform) can always reflect the current runtime environment of the cloud platform. In one embodiment, when the simulator installation package is updated at the cloud platform, the apparatus 100 is instructed to download it. In one embodiment, the simulator installation package is in the form of binary; in another embodiment, the simulator installation package is in the form of codes that may be interpreted and executed or compiled and executed. After the simulator installation package is downloaded to the apparatus 100, it is installed and set at the apparatus 100, thereby implementing the simulator 120. In one embodiment according to the present invention, the simulator 120 is embodied as one button or a group of buttons in the integrated developing environment in the apparatus 100. Simulation is performed by pressing said buttons. In another embodiment, the simulator 120 is embodied as a stand-alone module in the apparatus 100.

In one embodiment according to the present invention, the simulator 120 is configured to launch, for each VM, a process or thread to perform said simulation. Hereinafter, only the thread is taken as an example for explanation, but it is obvious that the process is also within the scope of the present invention.

The case in FIGS. 5 and 7 will be taken as an example for explanation. As for the example in FIGS. 5 and 7, the simulator 120 launches three threads to simulate the three VMs in FIG. 5. In one embodiment according to the present invention, validating said running order includes executing respective scripts in order in corresponding processes or threads according to the running order included in said topology skeleton. Specifically, according to the order of serial numbers in the names of script package folders in FIG. 7, respective launched threads execute script files in script packages. For example, three threads (a thread 1 corresponds to the VM Custom Node, a thread 2 corresponds to the VM Dmgr, and a thread 3 corresponds to the VM HTTP Server) execute script files under folders VM_CustomNode\1_Install_Application_Binaries, VM_Dmgr\1_Install_Application_Binaries and 1_Install_HTTP_Server_Binaries in parallel. After the thread 3 executes the script file under the 1_Install_HTTP_Server_Binaries folder, the thread 2 executes the script file under the 2_Create_Web_Server folder; after the thread 2 executes the script file under the 2_Create_Web_Server folder, the thread 1 executes the script file under the 3_Add_Custom_Node_to Dmgr folder; after the thread 1 executes the script file under the 3_Add_Custom_Node_to_Dmgr folder, the thread 2 executes the script file under the 4_Add_Member_to_Cluster folder.

In one embodiment according to the present invention, validating data dependency includes running the import method and the export method in respective scripts to check parameters defined in said import method and export method. For example, checking parameters defined in said import method and export method includes checking at least one of the number, the names and the value constraints of said parameters. The case in FIGS. 5 and 7 will be taken as an example for explanation. In FIGS. 5 and 7, the script file under the 3_Add_Custom_Node_to_Dmgr folder needs to be executed after the script file under the 2_Create_Web_Server folder, and there is data dependency between them. Specifically, four parameters need to be transferred (see FIG. 5). It is assumed that the export( ) method of the script file under the 2_Create_Web_Server folder is:

def export( ):
sys.export['DMGR_IP']
sys.export['DMGR_PORT']

and the import( )method of the script file under the 3_Add_Custom_Node_to_Dmgr folder is:

def import( ):
        DMGR_IP=sys.parameters['DMGR_IP']
        DMGR_PORT=sys.parameters['DMGR_PORT' ]
        DMGR_USERNAME=sys.parameters['DMGR_USERNAME']
        DMGR_PASSWORD=sys.parameters['DMGR_PASSWORD']

whereupon through simulation at the apparatus 100, it can be found that the export method of the script package "2. Create Web Server" exports only two of four input parameters required by the script package "3. Add Custom Node to Dmgr". That is, when actual deployment is performed according to the current topology design, errors will occur because data dependency is not satisfied. With one embodiment of the present invention, the problem can be found and solved at the client side before actual deployment, so that a great deal of time can be saved for actual deployment.

In one embodiment, in addition to the number of the parameters, it is also possible to check the names of the parameters defined in import methods and export methods of script packages that have data dependency to find unmatched parameters. For example, the parameter USERNAME in the export method of the script package 1 and the parameter SUBSCRIBERNAME in the import method of the script package 2 that depends on the script package 1 belong to a case where parameters' names do not match. In another embodiment, it is also possible to check, according to the types of the parameters, the value constraints of the parameters transferred between script packages. For example, the IP parameter should be in the form of four numeric values spaced apart by ".", such as "192.168.1.1", the PORT parameter should be a numeric value, and the USERNAME and PASSWORD parameters should be character strings. Transferring of parameters that violate value constraints may also be considered as not satisfying data dependency.

The above describes checking of import methods and export methods in script files. In one embodiment according to the present invention, the simulator 120 is configured to not run the implement method in respective scripts but only check at least one of the syntax error and the spelling error in the implement method. That is, the simulator 120 only executes the import method and the export method in a script file, but not run the implement method in the script file. This is because some functions (e.g., actual installation of middleware) of implement methods cannot be executed in the apparatus 100. When being deployed on the cloud platform, all of the import method, the export method and the implement method will be executed. By skipping the implement method at the apparatus 100, execution of simulation may be accelerated. On the other hand, by checking syntax errors and/or spelling errors in content added to the implement method by the user through the editor in program level, errors can be found in advance, and it is possible to avoid errors occurring during actual deployment, which wastes a great deal of time.

Figure 9A:
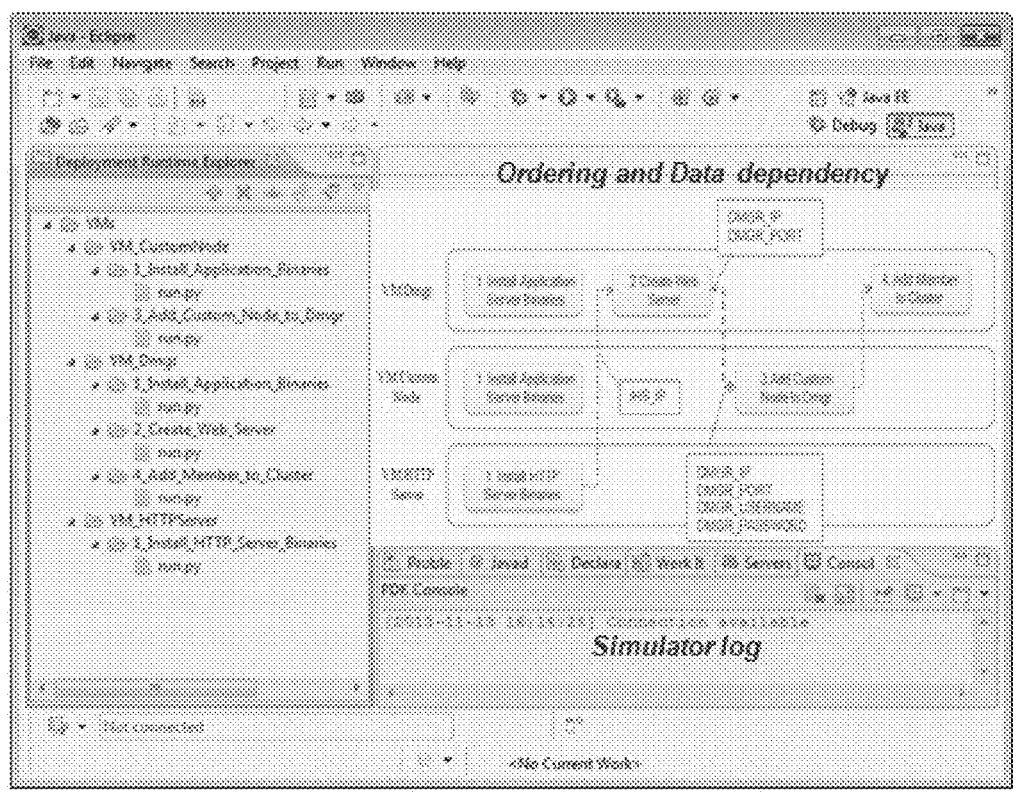
FIG. 9A shows an example in which a reporter reports a data dependency error to a user.
Figure 9B:
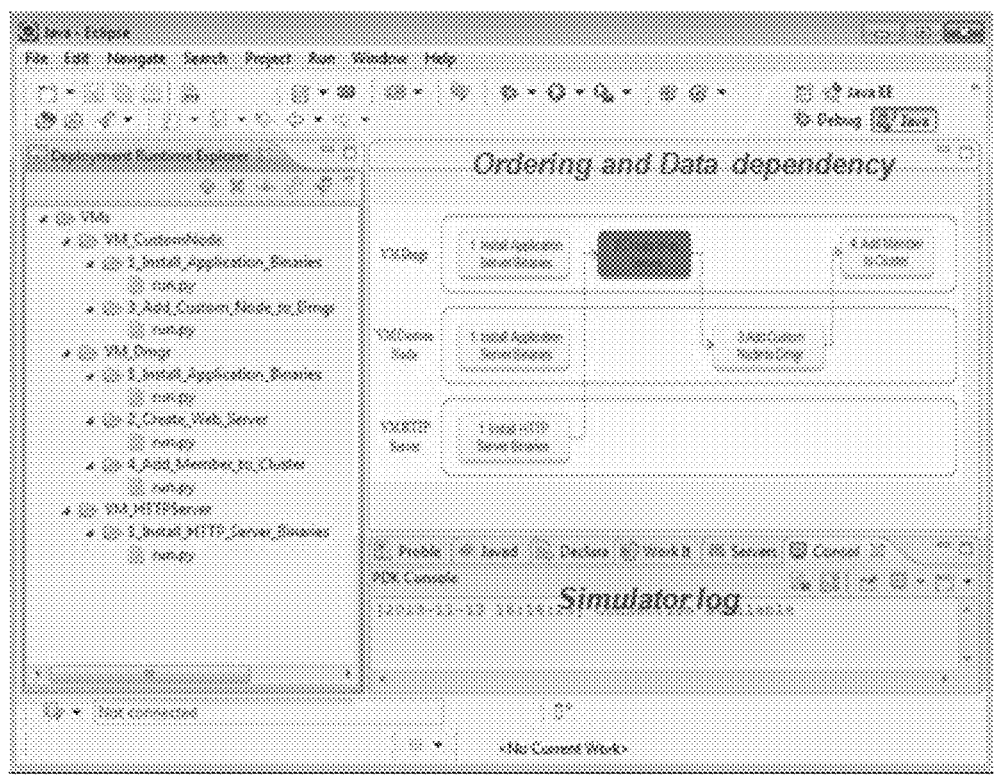
FIG. 9B shows an example in which a reporter reports a syntax error or a spelling error to the user.

In one embodiment according to the present invention, the apparatus 100 also includes a reporter configured to report to the user at least one of the following errors found in the simulation procedure of the simulator: data dependency error, syntax error and spelling error. FIG. 9A shows an example in which the reporter reports a data dependency error to the user. In FIG. 9A, the following example is shown: the number of the parameters in the export method of the script package "2. Create Web Server" and that of the import method of the script package "3. Add Custom Node to Dmgr" described above are not identical. In this case, the simulator 120 finds the data dependency error, and the reporter reports the data dependency error to the user. Specifically, in FIG. 9A, the reporter highlights (or displays in a different color) the arrow connected from the script package "2. Create Web Server" to the script package "3. Add Custom Node to Dmgr" (e.g., displayed as a thick arrow), and displays the former's output parameters and the latter's input parameters. In this way, the user may easily recognize and locate the data dependency error. FIG. 9B shows an example in which the reporter reports a syntax error or a spelling error to the user. In FIG. 9B, for example, when the simulator 120 finds a syntax error or a spelling error in the implement( )method of the script file of the script package "2. Create Web Server", the reporter highlights (or displays in a different color) the graphic representation of the script package "2. Create Web Server", so that the user may eliminate the syntax error or the spelling error in the script package by clicking the graphic representation of the script package to edit the script of the script package. By doing so, it is possible to avoid errors occurring during actual deployment due to the fact that the syntax error or the spelling error is contained in the content added in the implement method by the user.

According to one embodiment of the present invention, the apparatus 100 may also include a deployer. When no error is found in the simulation executed by the simulator 120, the deployer may deploy the application to the cloud platform according to said topology design.

Figure 10:
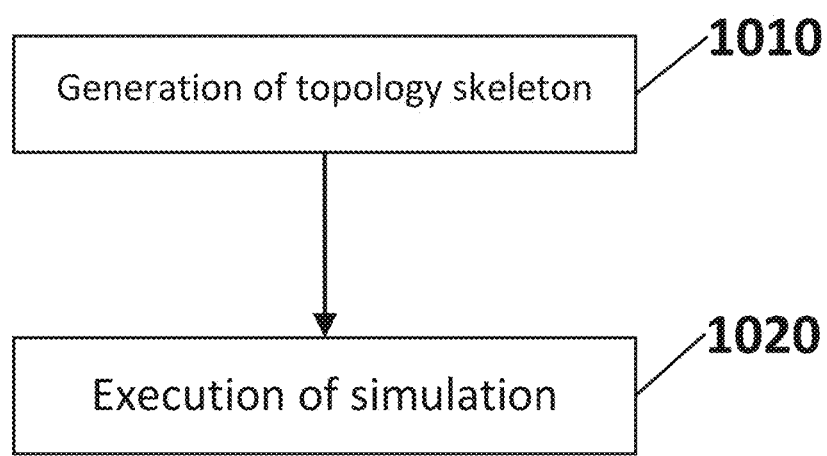
FIG. 10 is a flowchart showing a method for validating application deployment topology in a cloud computing environment at an apparatus 100 according to an embodiment of the present invention.

FIG. 10 is a flowchart showing a method for validating application deployment topology in a cloud computing environment at the apparatus 100 according to an embodiment of the present invention. The validating method includes a topology skeleton generation step 1010 and a simulation execution step 1020. In the topology skeleton generation step 1010, based on multiple VMs and script packages running on the VMs created by the user and required to deploy the user's application as well as running order of said script packages and data dependency between said script packages set by the user, a topology skeleton is generated, and the topology skeleton includes at least scripts of script packages of respective VMs and running order of the script packages. In the simulation execution step 1020, a simulator is configured to simulate a runtime environment in the cloud computing environment at said apparatus, thereby validating said running order and data dependency with respect to said topology skeleton, wherein said simulator is installed in the apparatus by using a simulator installation package retrieved from the cloud computing environment. Since the process flow has been described in detail with respect to the apparatus 100 hereinabove, explanation is not repeated here.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus for validating application deployment topology in a cloud computing environment comprising:
   a topology skeleton generator configured to generate, based on multiple VMs and script packages running on the VMs created by a user and required to deploy an application of the user as well as running order of the script packages and data dependency between the script packages set by the user, a topology skeleton that comprises at least scripts of script packages of respective VMs and running order of the script packages, wherein the script comprises an import method for getting input parameters from the outside and an export method for exporting parameters to the outside; and
   a simulator configured to simulate a runtime environment in the cloud computing environment at the apparatus, thereby validating the running order and data dependency with respect to the topology skeleton, wherein the simulator is installed in the apparatus by using a simulator installation package retrieved from the cloud computing environment, and wherein validating data dependency comprises running the import method and the export method in respective scripts to check parameters defined in the import method and export method.

2. The apparatus according to claim 1, wherein the topology skeleton is in the form of tree folder, each VM corresponds to a VM folder under the root folder, each script package running on a VM corresponds to a subfolder under the VM folder, and each subfolder contains a script.

3. The apparatus according to claim 1, wherein the script is a default script, and the apparatus also comprises an editor, which may be used by the user to edit at least a part of the default script.

4. The apparatus according to claim 1, wherein the simulator installation package is updated at the cloud side in response to changes in the cloud environment.

5. The apparatus according to claim 1, wherein the simulator is configured to launch, for each VM, a process or thread to perform the simulation.

6. The apparatus according to claim 5, wherein validating the running order comprises executing respective scripts in order in corresponding processes or threads according to the running order included in the topology skeleton.

7. The apparatus according to claim 1, wherein the script also comprises an implement method for implementing the function of the script specifically, and the simulator is configured to not run the implement method in respective scripts but only check at least one of syntax error and spelling error in the implement method.

8. The apparatus according to claim 1, further comprising a reporter configured to report to the user at least one of the following errors found in the simulation procedure of the simulator:
   data dependency error, syntax error and spelling error.

9. The apparatus according to claim 1, wherein checking parameters defined in the import method and export method comprises checking at least one of the number, the names and the value constraints of the parameters.

10. A method for validating application deployment topology in a cloud computing environment at an apparatus comprising:
    based on multiple VMs and script packages running on the VMs created by a user and required to deploy an application of the user as well as running order of the script packages and data dependency between the script packages set by the user, generating a topology skeleton that comprises at least scripts of script packages of respective VMs and running order of the script packages, wherein the script comprises an import method for getting input parameters from the outside and an export method for exporting parameters to the outside; and
    configuring a simulator to simulate a runtime environment in the cloud computing environment at the apparatus, thereby validating the running order and data dependency with respect to the topology skeleton, wherein the simulator is installed in the apparatus by using a simulator installation package retrieved from the cloud computing environment, and wherein validating data dependency comprises running the import method and the export method in respective scripts to check parameters defined in the import method and export method.

11. The method according to claim 10, wherein the topology skeleton is in the form of tree folder, each VM corresponds to a VM folder under the root folder, each script package running on a VM corresponds to a subfolder under the VM folder, and each subfolder contains a script.

12. The method according to claim 10, wherein the script is a default script, and the user may use an editor included in the apparatus to edit at least a part of the default script.

13. The method according to claim 10, wherein the simulator installation package is updated at the cloud side in response to changes in the cloud environment.

14. The method according to claim 10, wherein the simulator is configured to launch, for each VM, a process or thread to perform the simulation.

15. The method according to claim 14, wherein validating the running order comprises executing respective scripts in order in corresponding processes or threads according to the running order included in the topology skeleton.

16. The method according to claim 10, wherein the script also comprises an implement method for implementing the function of the script specifically, and the simulator is configured to not run the implement method in respective scripts but only check at least one of syntax error and spelling error in the implement method.

* * * * *